United States Patent

Cheung et al.

[11] Patent Number: 6,163,540
[45] Date of Patent: Dec. 19, 2000

[54] SYSTEM AND METHOD FOR ESTABLISHING UNIQUE SEQUENCE IDENTIFICATION IN AN INFORMATION EXCHANGE OF A SYSTEM NETWORK

[75] Inventors: Cyrus Cheung, Hercules; Darren Jones, Mountainview, both of Calif.

[73] Assignee: LSI Logic Corporation, Milpitas, Calif.

[21] Appl. No.: 09/040,086

[22] Filed: Mar. 17, 1998

[51] Int. Cl.[7] .................................................. H04J 3/24
[52] U.S. Cl. ........................................ 370/394; 709/236
[58] Field of Search ................................... 370/319, 359, 370/360, 389, 394, 470, 472, 476, 509; 709/236

[56] References Cited

U.S. PATENT DOCUMENTS

| | | |
|---|---|---|
| 4,071,887 | 1/1978 | Daly et al. . |
| 5,245,616 | 9/1993 | Olson .................................. 714/748 |
| 5,309,435 | 5/1994 | Hirome ................................ 370/244 |
| 5,577,039 | 11/1996 | Won et al. . |
| 5,604,735 | 2/1997 | Levinson et al. ...................... 370/360 |
| 5,608,733 | 3/1997 | Vallee et al. ......................... 370/394 |
| 5,619,497 | 4/1997 | Gallagher et al. .................... 370/394 |
| 5,889,764 | 3/1999 | Needham et al. ..................... 370/263 |
| 5,930,255 | 7/1999 | Tsukamoto et al. .................. 370/397 |
| 6,006,283 | 12/1999 | Hsieh et al. ............................ 710/9 |

*Primary Examiner*—Hassan Kizou
*Assistant Examiner*—Ahmed Elallam
*Attorney, Agent, or Firm*—Conley, Rose & Tayon

[57] ABSTRACT

A computer network is provided with a low-complexity sequence identification number determination method. In one embodiment, the computer network comprises a local node coupled to a remote node by a serial communications link to conduct data exchanges with the remote node. Each data exchange is provided with an exchange identification number, and each data exchange is made up of sequences of consecutive frames. Each sequence transmitted from the local node is assigned a sequence identification number by the local node. To maintain the uniqueness of the serial identification numbers of concurrently active sequences, a portion of each serial identification number is set equal to the exchange identification number of the data exchange of which the sequence is a part. The exchange identification number may be one assigned to the exchange by the remote node. In one implementation, the sequence identification number is a byte having the six most significant bits set equal to the exchange identification number. The local node may include a serial communications transceiver coupled to a transmit controller and a receive controller. The transmit controller would then generate frame headers for each data frame and determine the sequence identification number to be included.

12 Claims, 3 Drawing Sheets

SYSTEM AND METHOD FOR ESTABLISHING UNIQUE SEQUENCE IDENTIFICATION IN AN INFORMATION EXCHANGE OF A SYSTEM NETWORK

BACKGROUND OF THE INVENTION

1. Field of the Invention

This invention relates to the field of computer networking, and in particular to a low complexity information exchange management system.

2. Description of the Related Art

Internetworking of high-performance computers has become the focus of much attention in the data communications industry. Performance improvements in processors and peripherals, along with the move to distributed architectures such as client/server, have spawned increasingly data-intensive and high-speed networking applications, such as medical imaging, multimedia, and scientific visualization. However, the interconnections between the systems and their input/output devices cannot keep up with the blinding data rates, nor can they provide the distances needed for local area networks spanning campus-wide areas.

According to "Amdahl's Law", a megabit per second of input/output (I/O) capability is needed for every MIPS of processor performance. Current communications standards top out at just over 100 megabits per second, not nearly fast enough, as technical computing applications already demand processors exceeding 1,000 MIPS. The deficiencies in current transmission rates results in the communications channel becoming a bottleneck to system performance.

A new protocol known as Fibre Channel is 10 to 250 times faster than existing networks, transmitting at rates exceeding 1 Gbps in both directions simultaneously. It defines standard media and signaling conventions for transporting data in a serial fashion, it provides an error correcting channel code and a frame structure for transporting the data, it sets out a flow control methodology, creates some common services, and supports interfaces to existing higher level protocols such as SCSI (small computer system interface). The Fibre Channel protocol can be applied to various network topologies including point-to-point, ring, and switched. The Fibre Channel protocol is being proposed as an ANSI (American National Standards Institute, Inc.) standard, and a multitude of reference material is readily available at http://www.fibrechannel.com.

Communication across the Fibre Channel is provided using data frames. Consecutive data frames travelling in one direction form a sequence, and a group of related sequences combines to form an exchange. The higher level protocols supported by Fibre Channel perform "operations" such as: open, read, write, close, etc. An exchange may correspond to one of these operations. Each active sequence in an exchange is provided with a unique sequence identifier. This and other limitations on the sequence identifier are set forth in the Fibre Channel standard FC-PH (X3.269-199X revision 12) which is hereby incorporated by reference.

Each data frame incorporates a frame header immediately following a start-of-frame delimiter. The frame header among other things includes the sequence identifier. The following table describes the structure of the frame header:

| Word | Byte 3 | Byte 2 | Byte 1 | Byte 0 |
|---|---|---|---|---|
| 0 | R_CTL | | D_ID | |
| 1 | Reserved | | S_ID | |
| 2 | TYPE | | F_CTL | |
| 3 | SEQ_ID | DF_CTL | | SEQ_CNT |
| 4 | OX_ID | | | RX_ID |
| 5 | RLTV_OFF | | | |

The identity of each data frame is uniquely specified by the S_ID, D_ID, SEQ_ID, SEQ_CNT, and Sequence Context values. The OX_ID and RX_ID fields (generically referred to as the X_ID fields) may be used by a node to provide a locally assigned value to use in place of the S_ID, D_ID, and SEQ_ID values to identify frames in a sequence. A node makes use of these ID values in an implementation-dependent manner to uniquely identify open sequences. The description of each of the fields in the frame header is now provided.

R_CTL is a one byte field for routing control. It contains routing bits and information bits that categorize the frame function. Routing bits differentiate frames based on function or service within a node. These may indicate frames related to a specific upper level protocol operation or specify that the frame payload is to be directed to a video buffer (for example) without passing through the main data store. The information bits interpretation is dependent upon the routing bits field value, and may be an information category (i.e. solicited/unsolicited data/control/status) or a command.

Each node has an address identifier which is unique within the local address domain. D_ID is a three byte field that contains the address identifier specifying the destination of the frame, and S_ID is a three byte field that contains the address identifier specifying the source frame.

TYPE is a one byte field which is generally provided for specifying the data structure type (determined by the higher level protocol) of the frame content, but may also be used for indicating a reason code for a rejected frame. F_CTL is a three byte field that contains control information relating to the frame content and sequence flow control. Various flags are provided to indicate the status of the sequence and other flow control functions. The Sequence Context flag is in the F_CTL field, and it indicates whether the S_ID or D_ID node initiated the sequence.

SEQ_ID is a one byte field assigned by the sequence initiator. The SEQ_ID is unique for a specific D_ID and S_ID pair while the sequence is open. If the sequence initiator initiates a new sequence for the same exchange before receiving the final acknowledgement for the previous sequence, it is termed a streamed sequence. If streamed sequences occur, the sequence initiator must use X+1 different consecutive SEQ_IDs where X is the number of open sequences per exchange. If consecutive non-streamed sequences for the same exchange occur during a single sequence initiative, the sequence initiator must use a different SEQ_ID for each consecutive sequence. This may be accomplished by alternating between two SEQ_ID values.

DF_CTL is a one byte field that specifies the presence of optional headers at beginning of the data field for data frames. SEQ_CNT is a two byte field that indicates the sequential order of data frame transmission within a single sequence or multiple consecutive sequences for the same exchange. The sequence count of the first data frame of the first sequence of the exchange shall be binary zero, and the sequence count of each subsequent data frame in the sequence shall be incremented by one. If a sequence is streamed the sequence count of the first data frame of the sequence is incremented by one from the sequence count of the last data frame of the previous sequence (i.e. continuously increasing). If a sequence is non-streamed, the starting sequence count may be continuously increasing or binary zero. The sequence count wraps around to zero after reaching a value of 65535.

OX_ID is a two byte field that identifies the exchange ID assigned by the originator of the exchange. Each exchange is assigned an identifier unique to the originator or originator-responder pair. An originator exchange status block associated with the OX_ID is used to track the progress of a series of sequences which comprises an exchange. Similarly, RX_ID is a two byte field assigned by the responder to provide a unique, locally meaningful identifier at the responder for an exchange established by an originator and identified by an OX_ID. A responder exchange status block associated with the RX_ID is used to track the progress of a series of sequences which comprises the exchange.

RLV_OFF is a four byte field which indicates the relative displacement of the first byte of each frame's payload with reference to the base address of the information category. Providing a value for this field is optional.

The high data rates require that a large part of the Fibre Channel protocol be handled by hardware. The hardware implementation may incur unwanted cost and complexity, particularly if a large number of concurrent data exchanges are to be supported. Each sequence of each data exchange must be tracked by the network interface so that the interface can commence, conduct, and conclude information exchanges in an orderly fashion, conforming to the specified control flow and verifying the validity of each received data frame. The tracking information for each exchange is stored in a corresponding entry in an exchange table. It is desirable to provide a low-complexity method for supporting a large number of concurrent data exchanges.

SUMMARY OF THE INVENTION

The problems outlined above are in large part solved by a computer network which uses a low-complexity sequence identification number determination method. In one embodiment, the computer network comprises a local node coupled to a remote node by a serial communications link to conduct data exchanges with the remote node. Each data exchange is provided with an exchange identification number, and each data exchange is made up of sequences of consecutive frames. Each sequence transmitted from the local node is assigned a sequence identification number by the local node. To maintain the uniqueness of the serial identification numbers of concurrently active sequences, a portion of each serial identification number is set equal to the exchange identification number of the data exchange of which the sequence is a part. The exchange identification number may be one assigned to the exchange by the remote node. In one implementation, the sequence identification number is a byte having the six most significant bits set equal to the exchange identification number. The local node may include a serial communications transceiver coupled to a transmit controller and a receive controller. The transmit controller would then generate frame headers for each data frame and determine the sequence identification number to be included.

BRIEF DESCRIPTION OF THE DRAWINGS

Other objects and advantages of the invention will become apparent upon reading the following detailed description and upon reference to the accompanying drawings in which.

Figure 1:
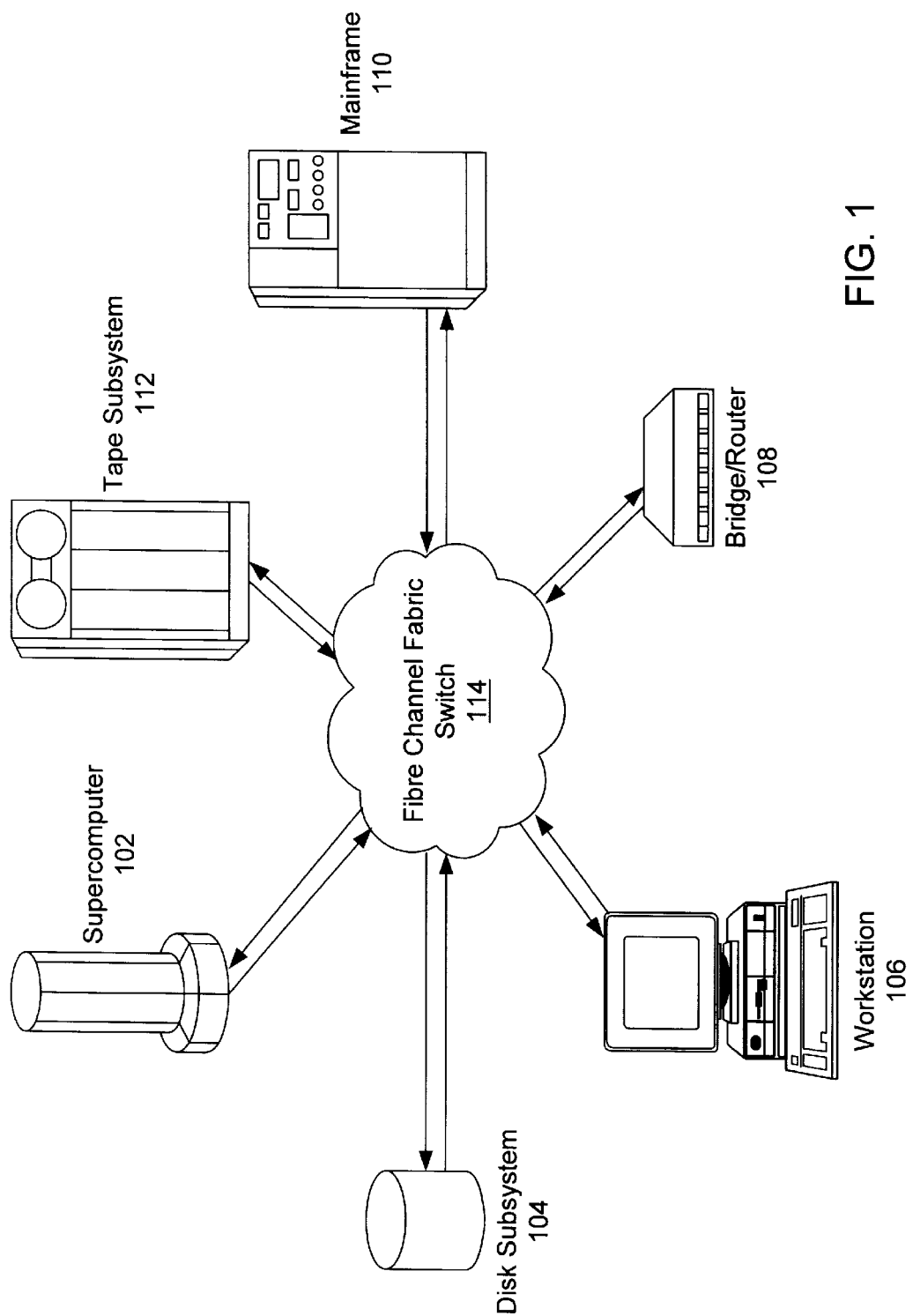
FIG. 1 shows a system network with exemplary nodes coupled via serial links.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 illustrates an exemplary system network having as nodes a supercomputer 102, a disk subsystem 104, a workstation 106, a bridge/router 108, a mainframe 110, and a tape subsystem 112. Each of the nodes is coupled to a central "fabric switch" 114 by a serial link having a receive channel and a transmit channel. The fabric switch 114 is shown nebulously since the exact network topology is unimportant to the present disclosure. It is sufficient to stipulate that the fabric switch 114 transports data frames and control words from the transmit channel of a source node to the receive channel of a destination node. The number and routing of concurrent connections is determined by the fabric switch.

Figure 2:
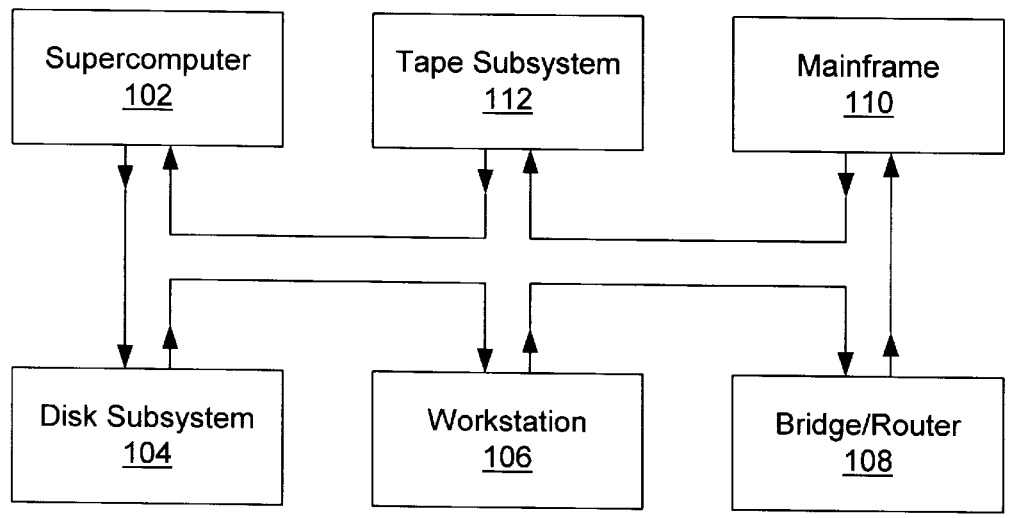
FIG. 2 shows a system network configured as an arbitrated loop.

One specific fabric switch embodiment is illustrated in FIG. 2. The nodes are coupled in an "arbitrated loop" topology, in which the transmit channel from one node is directly connected to the receive channel of the next node. In this topology, only one initiator-responder connection is supported at a time, with the rest of the nodes simply "passing along" anything they receive. Using control words, an initiating node first arbitrates to get control of the loop, then notifies a responding node of its desire to transmit data frames. The initiating and responding node negotiate a mutually agreeable frame size, then the responding node provides a buffer credit to the initiating node for each data frame it has space to accommodate. Upon receipt of the buffer credits, the initiating node begins transmitting data frames, one per credit, until the data has been sent.

The data frames moving between the initiating and responding node are organized in the following manner. Consecutive frames moving in the same direction form a sequence. A series of related sequences (in both directions) forms an exchange. Any given node may be participating in multiple concurrent exchanges, so a network interface unit receiving data frames must determine which exchange each data frame belongs to in order to track the progress of each exchange. Each data frame includes a frame header having (among other items) the following information: a destination address identifier (D_ID), the exchange identifier used by the exchange initiator (OX_ID), the exchange identifier used by the responder (RX_ID), a sequence identifier (SEQ_ID) provided by the sequence initiator, and a frame number within the sequence (SEQ_CNT).

Figure 3:
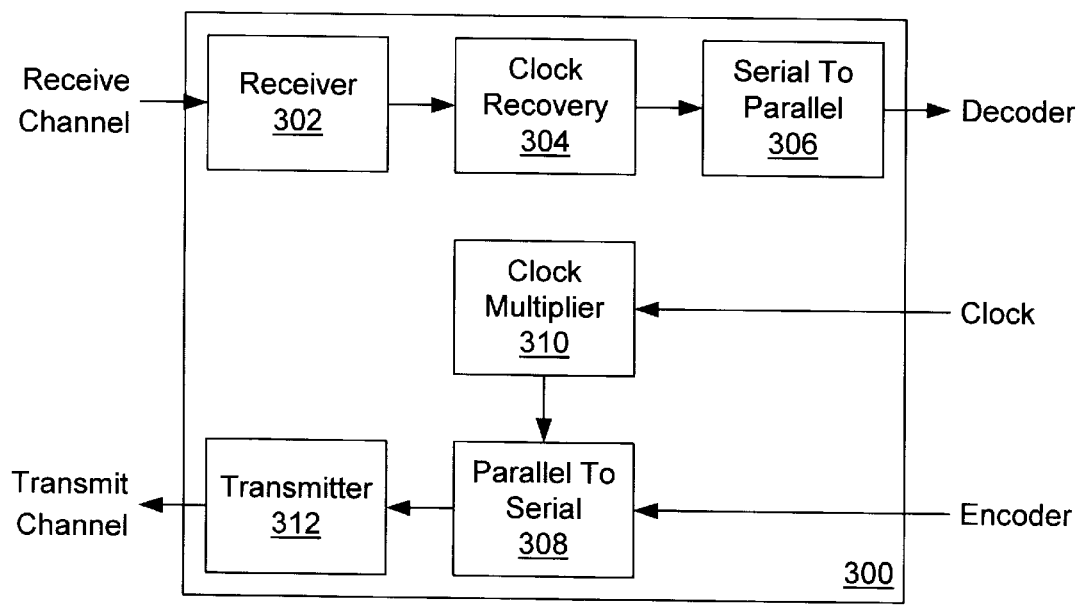
FIG. 3 shows a serial communication transceiver.

FIG. 3 illustrates a serial communication transceiver 300 that may be used by the nodes to couple to the serial communications link. Transceiver 300 includes a receiver 302 coupled to the receive channel to sense incoming signal levels, clean them up as much as possible, and provide them to a clock recovery module 304. Clock recovery module 304 uses the incoming signal to reconstruct a clock signal synchronized to the incoming data, and a serial-to-parallel converter 306 uses the reconstructed clock signal to convert the incoming signal from serial form to parallel form. In one embodiment, converter 306 outputs one 10-bit channel codeword at a time. The output from the converter 306 is sent to a decoder.

Transceiver 300 also includes a parallel-to-serial converter 308, which receives a stream of codewords from an encoder and uses a clock signal from clock multiplier 310 to convert the stream of codewords into a serial bitstream. Transmitter 312 then converts the serial bitstream into signals suitable for transport by the transmit channel. Transceiver 300 is typically provided on a network card, which resides on the I/O bus of a node. The interface between the transceiver 300 and the I/O bus is provided by a network interface unit such as that shown in FIG. 4.

Figure 4:
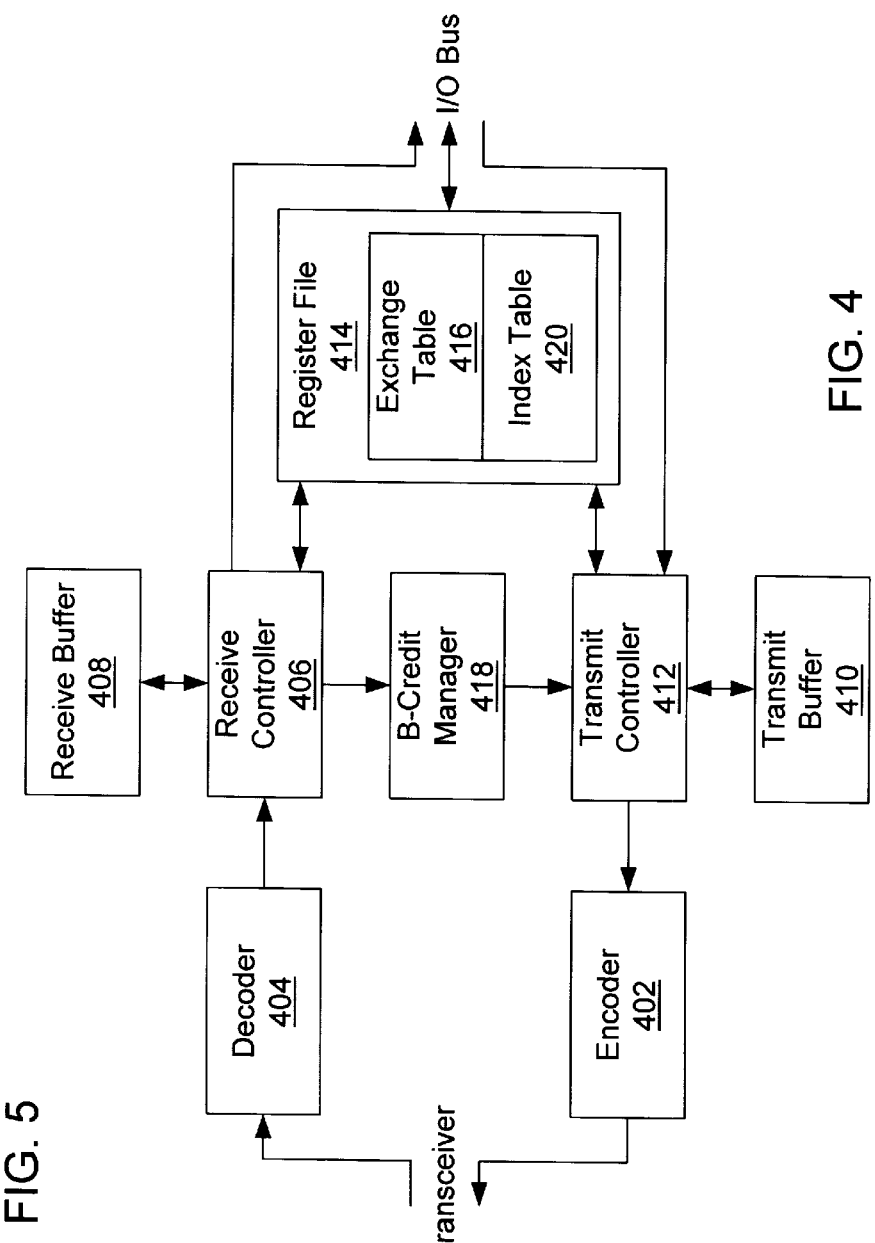
FIG. 4 shows a network interface unit, which uses indirect addressing to access an exchange table.

One embodiment of a network interface unit is provided in FIG. 4. It includes an encoder 402 and a decoder 404 coupled to the transceiver 300. Encoder 402 and decoder 404 provide error correction coding and decoding for information transmitted across the serial link. Decoded data from decoder 404 is provided to receive controller 406. The receive controller 406 stores received control words and data frames in receive buffer 408. If the node is in a "pass along" mode, the receive buffer 408 is also used as a transmit buffer 410. A transmit controller 412 retrieves control words and data frames from transmit buffer 410 and forwards them to encoder 402. If the node is transmitting or receiving data (i.e. participating in an exchange of data), receive controller 408 updates exchange information in register file 414 in response to received control words or data frames, and forwards data from received data frames to the node's i/o bus. Transmit controller 412 updates exchange information in register file 414 in response to commands and data from the node's i/o bus, generates control words and data frames in transmit buffer 410, and forwards them to encoder 402.

A processor at the local node may have access to register file 414 via the I/O bus. In one embodiment, the management of the network interface is done via a software driver resident in system memory. In this case, the incoming data and outgoing data may be written to and read from system memory via DMA (direct memory access) channels. The software driver determines when a data exchange is initiated or concluded, and maintains a list of concurrent data exchanges. Although there is no specified limit to the number of concurrent exchanges, it is likely that only a small number will be active (i.e. expecting that data frames for these exchanges will be sent or received in, say, the next 100 microseconds) at any given time. The processor stores tracking information for the active exchanges in an exchange table 416 in register file 414. To allow the receive and transmit controllers to quickly update the exchange tracking information, the processor also provides an index table 420 in register file 414. The index table 420 has an entry corresponding to each possible exchange number, and the value of the entries corresponding to active exchanges is set equal to the location of the tracking information in the exchange table 416. The receive or transmit controller needing to access or update the exchange table information can then first retrieve the exchange number from the frame header, reference the index table using this exchange number to determine the location of the tracking information in the exchange table, and then access or update the tracking information using the location provided. This advantageously provides a way for a large number of concurrent data exchanges to be efficiently supported using an exchange table of limited size. During its pendency, a data exchange may have its tracking information moved to and from system memory multiple times, and each time the exchange table slot that the information gets stored in may change. The controllers 406, 412 are able to track the changing exchange table slot since the location is updated in the index table every time the exchange changes from inactive to active.

Various methods for determining which of the concurrent exchanges are active may be used. The likelihood of processing frames may not be the only factor. Other factors may include node or task priority, predicted response time for data frames of an exchange, and limitations on numbers of simultaneously active exchanges of certain exchange types. If data frames for inactive data exchanges are received, the controllers will be unable to find the tracking information, and the frames may be rejected or replied to with a "Busy" control word so that the transmitting node is prompted to re-send the frame at a later time. Alternatively, the software driver may impose limitations on the concurrent exchanges to ensure that data frames for inactive exchanges are never processed, i.e. to ensure that the tracking information is always available for data frames being processed.

When using this arrangement, the assignment of the exchange numbers may be performed by retrieving available exchange numbers from a stack. Initially, all the exchange numbers are available, and as exchanges are initiated (either by the local node or by a remote node) exchange numbers are retrieved from the top of the stack. As exchanges are concluded, exchange numbers are returned to the bottom of the stack. Since little effort is involved and this occurs relatively infrequently, the assignment of exchange numbers may be accomplished by device driver software.

Many sequences may be initiated for each exchange, and it is desirable to provide a low-complexity method for hardware to assign a sequence ID number without the involvement of software. It is impractical to have software scan through all the active exchanges to determine a unique sequence ID number between the source and destination nodes. Since the exchange numbers locally assigned to the exchanges are already unique, mapping these numbers to sequence ID numbers ensures that the sequence IDs will be unique.

Figure 5:
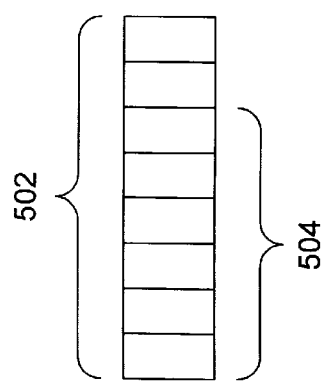
FIG. 5 shows a binary representation of a sequence number.

In one embodiment, the network interface supports 64 active exchanges. As shown in FIG. 5, the sequence ID number 502 is one byte, so setting the first six bits of the sequence ID to the exchange number leaves two bits unassigned. These two bits may then be assigned by the hardware of this embodiment in the following manner: sequences for the SCSI XFER_RDY command are assigned one hard-coded setting (e.g. 00), sequences for the SCSI RSP command are assigned a second hard-coded setting (e.g. 01), and data frame sequences alternate between the two remaining settings (e.g. 10 and 11). This assignment of sequence ID numbers is easily handled in hardware. In one embodiment, the remote exchange ID is used. In another embodiment, the originator exchange ID (OX_ID) is used.

Also shown in FIG. 4 is a buffer-credit manager 418. As described previously, before an initiating node can transmit a data frame to a responding node, it must first secure a buffer credit from that node. Consequently, when receive controller 406 receives a control word indicating that a remote node wishes to transmit data, the buffer credit manager 418 is enabled, and the transmit controller 412 begins transmitting buffer credit control words in response to a credit signal from buffer credit manager 418. At the beginning of an exchange, the receive buffer 408 is empty of data frames, and the buffer credit manager 418 is provided with the negotiated frame size and the receive buffer capacity, and it is expected to generate and manage a number of buffer credits equal to the receive buffer capacity divided by the frame size, with as little delay as possible.

Numerous variations and modifications will become apparent to those skilled in the art once the above disclosure is fully appreciated. It is intended that the following claims be interpreted to embrace all such variations and modifications.

What is claimed is:

1. A computer network which comprises:

a remote node;

a local node coupled to the remote node by a serial communications link to conduct data exchanges with the remote node, wherein each data exchange is associated with an exchange identification number, wherein each data exchange comprises sequences of consecutive frames, and wherein each sequence transmitted from the local node is assigned a sequence identification number by the local node, wherein the sequence identification number has a binary representation which includes a group of bits set equal to respective bits in a binary representation of the exchange identification number.

2. The computer network of claim 1, wherein the exchange identification number is assigned to the exchange by the remote node.

3. The computer network of claim 1, wherein the group of bits consists of six most significant bits in the binary representation of the sequence identification number.

4. The computer network of claim 1, wherein the local node includes a network interface unit having:

a serial communications transceiver for driving transmit signals on a serial communications link and for buffering receive signals on the serial communications link;

a transmit controller coupled to provide the transmit signal to the serial communications transceiver; and a receive controller coupled to receive the receive signal from the serial communications transceiver.

5. The computer network of claim 4, wherein the transmit controller generates a frame header for each data frame in sequences transmitted from the local node, wherein the frame header includes the sequence identification number, and wherein the transmit controller determines the sequence identification number by appending bits to the exchange identification number.

6. The computer network of claim 5, wherein the transmit controller appends a first set of bits and a second, different set of bits to the exchange identification number, wherein the transmit controller alternates between the sets of bits for consecutive sequences in an exchange.

7. The computer network of claim 4, wherein the network interface further includes a register file for storing an exchange table and an index table, wherein the exchange table has a predetermined number of slots for storing information about an exchange, and wherein the index table has an entry for each ongoing exchange to indicate which of the predetermined number of slots is storing information about the exchange; wherein the transmit and receive controllers are coupled to the register file to reference the index table to determine a current exchange table slot corresponding to a current exchange and thereby update information in the current exchange table slot.

8. The computer network of claim 7, wherein a processor is coupled to the register file via a local i/o bus, wherein the processor is configured to support a number of concurrent exchanges, wherein the number of concurrent exchanges is greater than the predetermined number of slots in the exchange table, and wherein the processor is configured to free exchange table slots corresponding to ongoing exchanges which are inactive for a predetermined time.

9. The computer network of claim 8, wherein the receive controller receives data frames from the remote node, wherein the receive controller accesses the exchange table slot corresponding to the exchange to which the data frame belongs to update a remote exchange identification number field.

10. The computer network of claim 9, wherein the transmit controller accesses the exchange table slot corresponding to the current exchange to retrieve the remote exchange identification number for generating the sequence identification number for a data frame header.

11. A method for managing concurrent data exchanges between a local node and one or more remote nodes coupled to the local node by a serial communications link, wherein the method comprises:

determining an exchange identification number associated with each data exchange;

appending bits to the exchange identification number to determine a sequence identification number;

generating headers for data frames transmitted from the local node, wherein the headers include sequence numbers indicative of the data exchange to which the data frames belong.

12. The method of claim 11, wherein the determining an exchange identification number comprises:

receiving a frame from a remote node;

extracting the exchange identification number from a header in the data frame.

* * * * *